United States Patent

Hashmi

[11] Patent Number: 5,168,010
[45] Date of Patent: Dec. 1, 1992

[54] REVERSIBLE OXIDIZER/AGENT AND FUEL RESISTANT GLOVE

[75] Inventor: Tasaddaq H. Hashmi, Willard, Ohio
[73] Assignee: Brunswick Corporation, Skokie, Ill.
[21] Appl. No.: 516,693
[22] Filed: Apr. 30, 1990
[51] Int. Cl.$^5$ .................. B32B 27/06; A41D 19/00
[52] U.S. Cl. .................. 428/215; 428/421; 428/492; 428/519; 2/168; 427/302; 427/430.1
[58] Field of Search ............... 428/519, 492, 421, 215; 2/168

[56] References Cited

U.S. PATENT DOCUMENTS

| | | |
|---|---|---|
| 1,468,791 | 9/1923 | Abraham et al. |
| 2,657,394 | 11/1953 | Milton, Jr. et al. |
| 2,873,450 | 2/1959 | Brodeur, Jr. |
| 3,225,360 | 12/1965 | Keilen, Jr. et al. |
| 3,411,982 | 11/1968 | Kavalir et al. ............ 428/519 |
| 3,975,776 | 8/1976 | Ayres . |
| 3,994,643 | 11/1976 | Joslin et al. |
| 4,214,321 | 7/1980 | Nuwayser . |
| 4,578,826 | 4/1986 | Adiletta . |
| 4,860,385 | 8/1989 | Zidele . |

FOREIGN PATENT DOCUMENTS 765762  1/1957  United Kingdom .

*Primary Examiner*—P. C. Sluby
*Attorney, Agent, or Firm*—Wood, Phillips, VanSanten, Hoffman & Ertel

[57] ABSTRACT

Articles of protective wear are normally designed to protect a wearer against one or one group of hazardous materials such as chemical warfare agents. Such chemical warfare protective wear is normally made out of a butyl rubber as butyl rubber provides favorable impermeation protection against a wide variety of both chemical and biological warfare agents while having excellent physical properties. However, the protection provided by butyl rubber based protective wear is seriously reduced when exposed to hydrocarbons as the butyl rubber based protective wears' impermeation integrity is severely impaired. This problem is solved by using an article of protective wear which has a multilayer/multipolymer configuration so that enhanced protection against more than one type of material, such as hydrocarbons and chemical warfare agents, is provided. More specifically, the article has a first layer comprising a hydrocarbon resistant resin and a second layer having a resin modified butyl rubber layer, the butyl rubber base being characterized in having crosslinks formed by a resin rather than by sulphur or sulphur bearing materials. Also included is a method of formation of such articles.

17 Claims, 2 Drawing Sheets

REVERSIBLE OXIDIZER/AGENT AND FUEL RESISTANT GLOVE

SUMMARY OF THE INVENTION

This invention relates generally to protective apparel and a process of producing such apparel, and more particularly to a seamless layered elastomeric article of protective wear which may be of irregular shape which provides enhanced protection to the wearer, and a process for making the same.

BACKGROUND OF THE INVENTION

In providing clothing, such as gloves and boots, for example, which is effective for protecting the wearer against hazardous materials, it is often difficult to protect against more than one particular class of hazardous material. For example, protective wear designed to protect against chemical warfare agents and/or toxological agents such as nerve gases and mustard gas, are normally made out of a butyl rubber such as isobutylene-isoprene (IIR) which may be a copolymer of isobutylene and isoprene typically having 1-5% of the diene monomer. The butyl rubber provides favorable impermeation protection against a wide variety of both chemical and biological warfare agents while providing excellent properties such as tensile strength, modulus of elasticity, tear resistance, low temperature flexibility and resistance to decontaminating agents and the latest U.S. Military specifications for protective clothing requires the use of butyl rubber as a base polymer. Further, the cost of alternatives to butyl rubbers is prohibitive.

However, problems arise in using butyl rubber based protective wear especially when the protective wear is exposed to hydrocarbons such as those found in fuels, oils and lubricants. The butyl rubber based protective wear, when subjected to such hydrocarbons, exhibits a drastic increase in volume as well as in weight. Properties such as tensile strength, modulus of elasticity, elongation at break, and abrasion resistance are drastically impaired. Consequently, also adversely affected is the article's impermeability which results in ineffective protection. An especially undesirable situation results when a butyl rubber based protective article has been exposed to such hydrocarbons in the presence of a hazardous material, such as strong oxidizers, including inhibited red fuming nitric acid (IRFNA) and hydrazine, both used as rocket fuels. In such a case, the article's integrity may be compromised by the hydrocarbon and the hazardous material may permeate through the article and contact a wearer.

A further problem with protective wear using sulfur-crosslinked butyl rubber as a base polymer is encountered in environments having elevated temperatures as the protective wear breaks down. More specifically, crosslinks in the butyl rubber provided by sulphur or sulphur bearing materials to strengthen the article are relatively unstable at elevated temperatures and tend to revert or, in other words, break due to the elevated temperature; and this adversely affects the efficacy of the protective wear.

The present invention is directed toward overcoming one or more of the problems as set forth above.

SUMMARY OF THE INVENTION

It is an object of the invention to provide a sheet-like material usable in protective apparel or the like which provides enhanced protection against more than one class of hazardous material or agent.

More specifically, it is an object of the invention to provide a layered, seamless, protective wear article, possibly irregularly shaped, exhibiting superior protection against such varied materials as chemical warfare agents, hydrocarbons, strong oxidizers, pesticides, and decontamination agents, while also having high temperature capabilities, longer shelf life, and excellent adhesion between various layers.

In one aspect of the present invention, there is provided a layered article, such as a glove, which includes an inner first and an outer second layer. The first layer includes a resin modified butyl rubber and the second layer includes a hydrocarbon resistant resin. A resin modified butyl rubber is defined to be a butyl rubber predominantly using a resin, as opposed to sulphur or sulphur bearing materials, to produce crosslinks during vulcanization of the article.

The invention also includes a process for the formation of such an article which includes the steps of contacting a form in the shape of the article to be produced with a hydrocarbon resistant resin based solution to form a layer of the hydrocarbon resistant resin based solution on the form and contacting the form having the hydrocarbon resin based solution layer thereon with a solution having a butyl rubber and a resin crosslinking agent to form a layer of the butyl rubber solution on the hydrocarbon resistant resin based solution layer. Thereafter, the butyl rubber solution layer is allowed to dry substantially and the butyl rubber layer is heated to form crosslinks from the resin crosslinking agent.

Other objects and advantages of the invention will become apparent upon reading the detailed description provided below with appropriate reference to accompanying drawings.

DETAILED DESCRIPTION OF THE INVENTION

Figure 1:
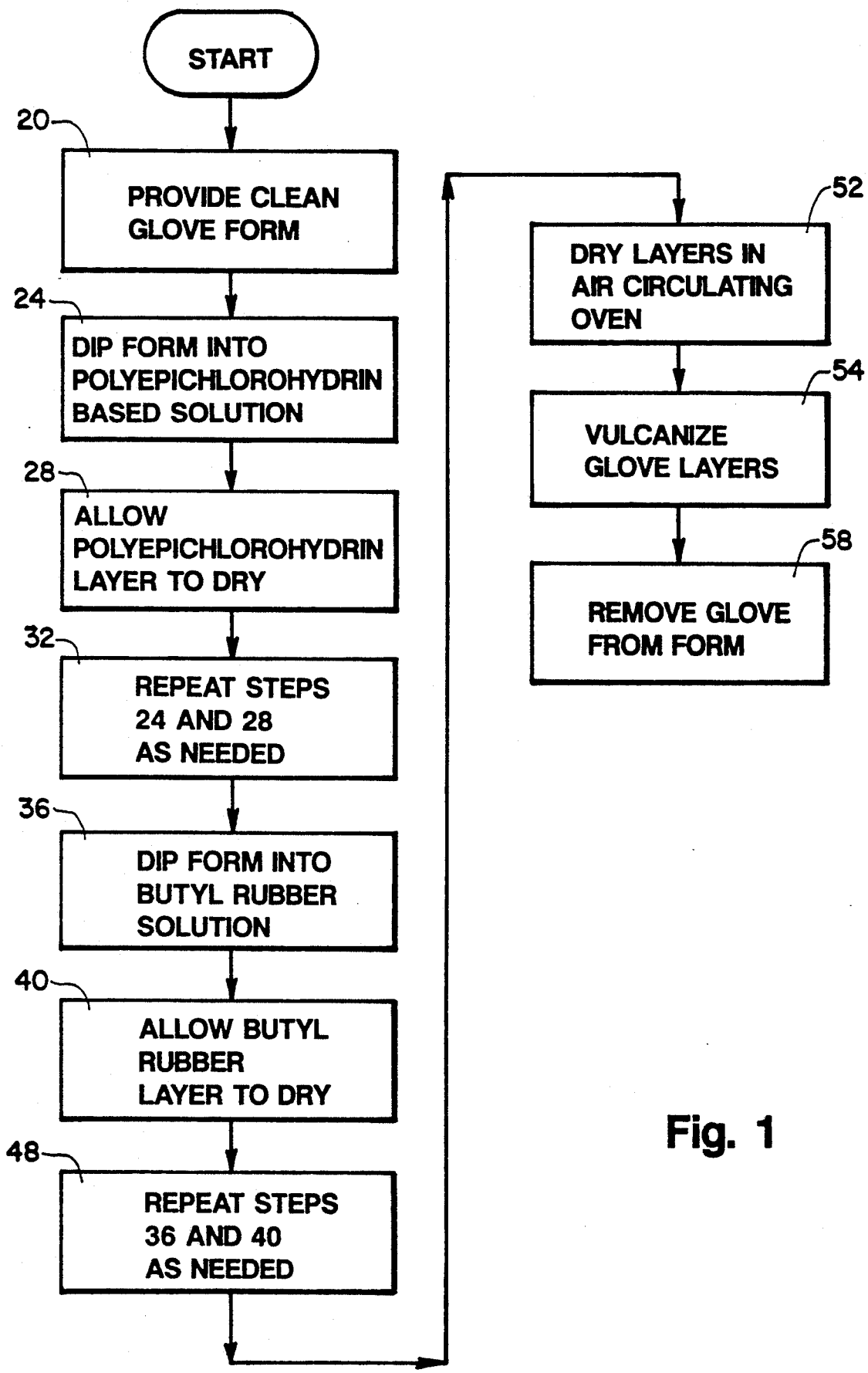
FIG. 1 is a flow diagram of the process of the invention.
Figure 2:
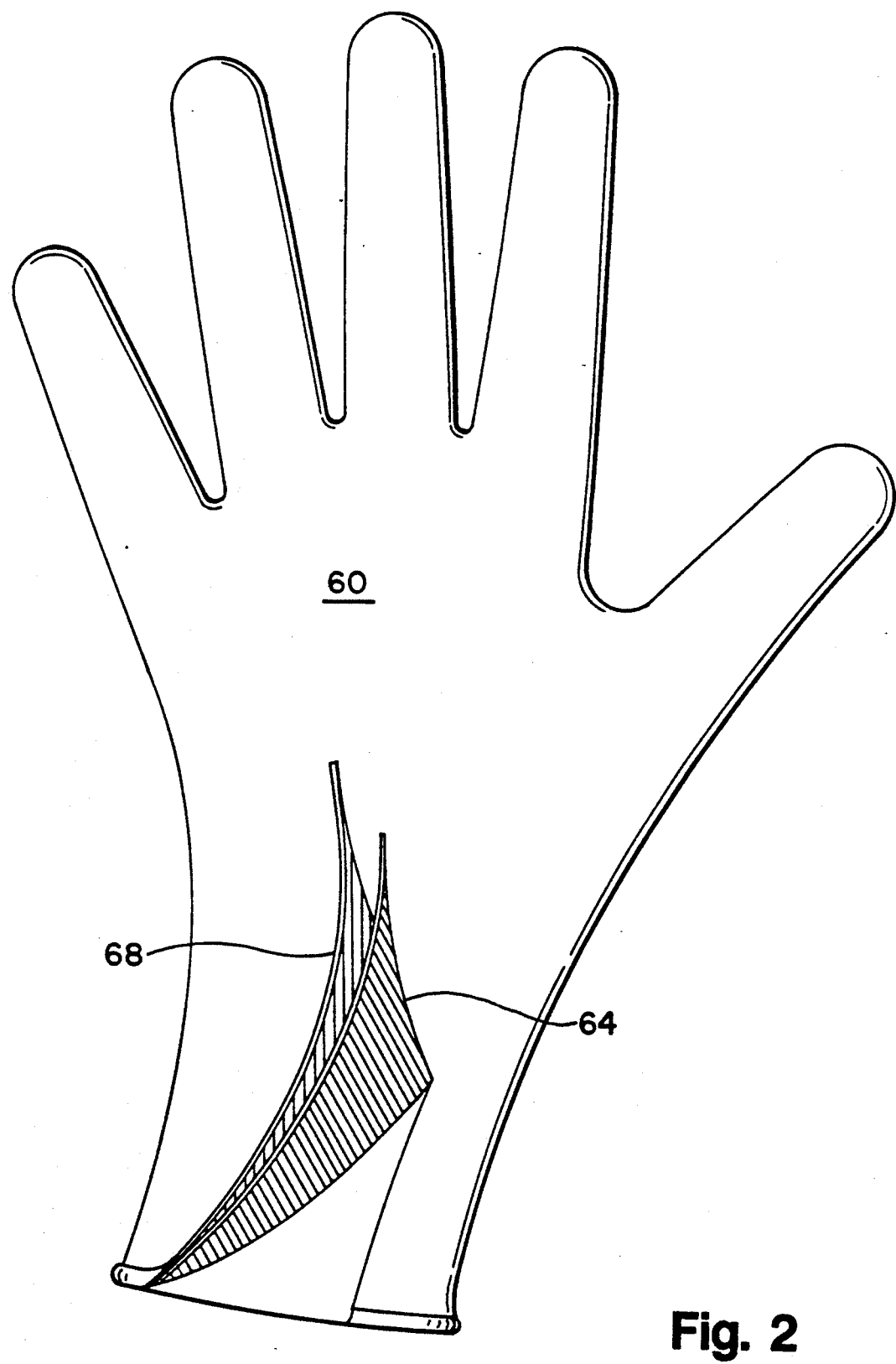
FIG. 2 is a cutaway view of a seamless glove made according the invention.

Turning now to the drawings and more particularly to FIG. 1, shown is a flow diagram of the process of the invention in forming a glove, such as that shown in FIG. 2. Although a glove is being used to illustrate the invention it should be understood that other articles, especially of protective wear, which require the same advantages and properties herein described, are also included within the scope of this invention.

The first step 20 of the process is to provide a clean glove mold or form. The forms, as known in the art, may be formed of porcelain. The forms preferably have been cleaned using solvents which are evaporated from the form and subsequently dried at elevated temperature to remove moisture.

The next step 24 is to dip the form into a polyepichlorohydrin (ECO) based solution. The form should be immersed and withdrawn from the solution slowly to provide for an even coating of the polyepichlorohydrin based solution on the glove form. The form may also be rotated to provide for an even layer and to assist in driving off any remaining solvent contained in the solution.

Polyepichlorohydrin provides the advantage of being hydrocarbon resistant. Other types of hydrocarbon resistant resins, however, may be used, such as nitrile rubbers, neoprene, and fluoroelastomers such as vinylidene fluoride and hexafluoropropylene, and combinations thereof.

The polyepichlorohydrin based solution includes a solution grade ECO and may include reinforcing agents, fillers, antioxidants (both phenolic and amine types), antiozonants, lubricants, plasticizers, vulcanizing ingredients including activators and accelerators, and other processing aids, as desired. A preferred composition for a solution is listed below in Table 1:

TABLE 1

| Ingredient | Amount (lbs) |
| --- | --- |
| Hydrin 400 CG | 100.0 |
| Stearic acid | 1.0 |
| NBC | 0.5 |
| Methyl niclate | 0.5 |
| Carbon black | 50.0 |
| Echo-P | 1.0 |
| Barium carbonate | 5.0 |
| Sulphur | 1.0 |
| Mercaptobenzothiazole | 1.0 |
| Tetramethyl thiuram monosulphide | 0.5 |
| Aflux 42 | 1.0 |
| | 161.5 |

Hydrin 400 CG is a commercial grade polyepichlorohydrin and is manufactured by B. F. Goodrich Chemical Company. Echo-P is a proprietary curing accelerator and is manufactured by Hercules Inc. Aflux 42 is an anti-tack composition which includes a mixture of fatty acids and fatty alcohols and is manufactured by Wyrough and Loser, Inc. of New Jersey. Stearic acid is an activator while NBC (nickel dibutyldithiocarbamate) and methyl niclate are antioxidants. The barium carbonate serves as an activator for the Echo-P. The mercaptobenzothiazole and tetramethyl thiuram monosulphide are also curing accelerators. The carbon black serves as a reinforcer, while the sulphur will provide crosslinks in the polyepichlorohydrin layer during the curing step, discussed later herein.

The composition should be mixed with at least one suitable solvent so that the solution is easily applicable to the form. In a preferred embodiment, 16 pounds of the composition listed in Table 1 is dissolved in approximately 79.8 pounds of xylene and 4.2 pounds of kerosene.

The layer of polyepichlorohydrin based solution is then allowed to dry 28. The dry time between dips in the preferred embodiment is approximately 60 minutes and during the dry time the forms are subjected to a temperature of approximately 110° to 120° F.

The dipping and drying steps 24, 28 are repeated (step 32) to form a desired thickness of the polyepichlorohydrin layer on the form.

The form having the polyepichlorohydrin layer thereon is then dipped 36 into a butyl rubber solution. Included in the solution is a resin crosslinking agent. The resin crosslinking agent is used as opposed to sulphur or sulphur bearing materials to form crosslinks upon curing or vulcanizing, as described later. Preferably, the resin crosslinking agent will be a phenolic resin, and more particularly an alkyl phenolic resin. A preferred composition for the solution is listed below in Table 2:

TABLE 2

| Ingredient | Amount (lbs) |
| --- | --- |
| Butyl Rubber 268 | 90.0 |
| Bromobutyl X2 | 10.0 |
| Stearic acid | 1.0 |
| Zinc oxide | 5.0 |
| Carbon black | 80.0 |
| Naphthenic process oil | 5.0 |
| Polyethylene AC-617A | 2.0 |
| Antioxidant 2246 | 1.0 |
| CRJ 352 | 10.0 |
| | 204.0 |

Butyl Rubber 268 is a butyl rubber manufactured by Exxon Corporation. Bromobutyl X2 is a curing activator which includes a brominated butyl rubber and is manufactured by Polysar Corporation. Polyethlene AC-617A is a plasticizer manufactured by Allied Chemical, and Antioxidant 2246 is antioxidant manufactured by Cyanamide Zinc oxide is also an activator. CRJ352 is a heat reactive alkyl phenolic resin manufactured by Schenectady Chemicals. other resins may be used for crosslinking such as SP1056 and HRJ2564, both brominated alkyl phenolic resins manufactured by schenectedy chemicals.

The butyl rubber composition should be mixed with an appropriate solvent or solvents so that application of the resin modified butyl layer to the form is facilitated. Preferably, 17.92 pounds of the composition in Table 2 is dissolved in 77.86 pounds of xylene and 4.09 pounds of kerosene.

It has been found that the use of accelerators containing bromine or chlorine helps to achieve a better and faster state of cure and also results in the article having better oxidizer/agent resistance. Examples of such halide containing accelerators, include Bromobutyl X2 manufactured by Polysar Corporation, and sulfur dichloride ($SCl_2$).

The form with the newly added butyl rubber layer thereon is dried at step 40 with the dry time between the dips being sixty minutes at approximately 110° to 120° F. The dipping and drying steps, 36, 44 are repeated at step 48 to produce the desired thickness of the butyl rubber layer.

It has been found that for the production of a 0.025 mil polyepichlorohydrin butyl rubber glove five dips in the polyepichlorohydrin based solution are followed by seven dips into the butyl rubber solution. The production of a 0.014 mil polyepichlorhydrin butyl rubber glove requires two dips into the polyephichlorohydrin based solution followed by five dips in the butyl rubber solution. For production of a 0.07 mil polyepichlorohydrin butyl rubber glove two dips into the polyepichlorohydrin based solution are followed by two dips into the butyl rubber solution.

Once the layers are substantially dry the glove is subjected to a further drying step 52 at 110° F. for an extended length of time, approximately sixteen to thirty-six hours, in an air circulating oven. This is done to remove as much of the solvents from the layers as possible before beginning the final dry/cure cycle.

The layers are then subjected to the final dry/cure cycle which is essentially a vulcanization step 54 which produces crosslinking by the alkyl phenolic crosslinking resin in the butyl rubber layer and the sulphur in the polyepichlorohydrin layer. Preferably, the vulcanization step is carried out at approximately the temperatures and for the times as listed in Table 3:

TABLE 3

| Temperature (°F.) | Time |
|---|---|
| 135 | 1.0 hour |
| 150 | 1.0 hour |
| 175 | 1.0 hour |
| 200 | 1.0 hour |
| 225 | 1.0 hour |
| 225 | 0.5 hour |
| 250 | 2.0 hours |
| 300 | 1.0 hour |
| 350 | 1.5 hours |

The gloves are cured at higher than normal vulcanization temperatures, which are normally 220° to 300° F., to increase the crosslink density produced by the resin crosslinking system. This enhances desired characteristics such as resistance of the films to acids and alkalies and also imparts generally enhanced impermeation characteristics to the glove.

The next step 58 in the removal of the glove is removed 58 from the form. The glove is removed such that it is turned inside out so that the polyepichlorohydrin layer is on the outside and the butyl rubber layer is on the inside of the glove. The process results in a layered, seamless glove.

The resin crosslinks that result from the process provide improved desirable characteristics as compared to articles using sulphur or sulphur bearing components as the crosslinking agent in the butyl rubber. These characteristics include an improved level of impermeation and resistance to delamination or separation of the layers. The aging resistance is also enhanced so that both shelf and service life are extended. Also, the glove's resistance to temperature-induced degradation is superior to that of articles using sulphur containing materials to crosslink. The combination of the two resins in one layered glove offers protection against more than one class of chemical agents, namely hydrocarbons and chemical warfare agents, among others.

Turning now to FIG. 2, shown is a glove, generally designated as 60, according to the invention. The glove 60 is seamless and includes an inner first layer 64 and an outer second layer 68.

The first layer 64 includes the resin modified butyl rubber while the second layer 68 includes the hydrocarbon resistant resin, such as those discussed previously. Further, the first layer 64 has a preferred thickness of 0.005 inches to 0.025 inches while the second layer 68 has a preferable thickness ranging between 0.003 inches to 0.015 inches, although other thicknesses may be used.

This multilayered/multipolymer approach results in enhanced protection against varied hazardous materials and in its simplest form consists of bringing together layers from two or more diverse polymeric based systems to produce a composite with properties not obtainable with individual elastomeric based systems.

While the invention is ideally suited for the production of irregularly shaped articles as gloves and boots, the invention contemplates regular shapes as well. For example the multilayer product of the invention could be made in sheet form for subsequent incorporation in, for example, aprons, protective curtains and the like.

I claim:

1. A layered article, such as a glove, comprising a first layer and a second layer on said first layer, said first layer comprising butyl rubber crosslinked using a phenolic resin and lacking sulfur crosslinks, and said second layer comprising a hydrocarbon resistant resin.

2. The article is recited in claim 1 wherein said resin crosslinking agent is an alkyl phenolic resin.

3. The article as recited in claim 1 wherein said hydrocarbon resistant resin is polyepichlorohydrin.

4. The article as recited in claim 1 wherein said hydrocarbon resistant resin is at least one resin selected from the group consisting of polyepichlorohydrin, nitrile rubbers, neoprene, and fluoroelastomers.

5. A layered, seamless, article of protective flexible material capable of protecting an object, said material comprising;
  a first layer comprising a vulcanized butyl rubber, said butyl rubber crosslinked with an alkyl phenolic resin and lacking sulfur crosslinks; and
  a second layer comprising a hydrocarbon resistant resin and bonded to said first layer.

6. The article of protective material as recited in claim 5 wherein said hydrocarbon resistant material is at least one resin selected from the group consisting of epichlorohydrin, nitrile rubbers, neoprene and fluoroelastomers.

7. The article of protective material as recited in claim 5 wherein said first layer has a thickness of between 0.005 inches to 0.025 inches.

8. The article of protective material as recited in claim 7 wherein said second layer has a thickness ranging between 0.003 inches to 0.015 inches.

9. The article of protective material as recited in claim 5 wherein said alkyl phenolic resin is selected from the group consisting of brominated alkyl phenolic resins and chlorinated alkyl phenolic resins.

10. The article of protective material as recited in claim 5 wherein said first layer is an inner first layer of the article and said second layer is an outer second layer of said article.

11. The article of protective material as recited in claim 5 wherein said hydrocarbon resistant resin is epichlorohydrin.

12. The article as recited in claim 1 wherein said phenolic resin is selected from the group consisting of brominated alkyl phenolic resins and chlorinated alkyl phenolic resins.

13. A layered article suitable to provide protection from warfare agents, the article comprising:
  a first layer of vulcanized butyl rubber produced by vulcanizing a dried butyl rubber and phenolic resin-containing solution; and
  a second layer comprising a hydrocarbon resistant resin, said second layer being bonded to said first layer.

14. The article as recited in claim 13 wherein said phenolic resin is an alkyl phenolic resin.

15. The article as recited in claim 13 wherein the phenolic resin is selected from the group consisting of brominated alkyl phenolic resins and chlorinated alkyl phenolic resins.

16. The article as recited in claim 13 wherein the hydrocarbon resistant resin is selected from the group consisting of polyepichlorohydrin, nitrile rubbers, neoprene and fluoroelastomers.

17. The article as recited in claim 13 wherein the hydrocarbon resistant resin is polyepichlorohydrin.

* * * * *